United States Patent Office 2,876,204
Patented Mar. 3, 1959

2,876,204
WAX-POLYETHYLENE-POLYISOBUTYLENE

Helmuth G. Schneider and David W. Young, Westfield, and Julius P. Rocca, Linden, N. J., assignors to Esso Research and Engineering Company, a corporation of Delaware No Drawing. Application December 7, 1951
Serial No. 260,582

10 Claims. (Cl. 260—28.5)

This invention relates to wax-polymer compositions, particularly to strengthening paraffin wax by adding small amounts of hydrocarbon polymers; and relates especially to three component mixtures of paraffin wax, polyisobutylene and polyethylene, of high strength and low tendency toward "blocking."

This application is a continuation-in-part of application Serial No. 671,904, filed May 23, 1946, now Patent 2,577,816.

The high water-resistance of paraffin wax has brought it into use as a waterproof coating or impregnating substance for preparing moisture-proof packages, wrappers and similar uses, but paraffin alone has been found to be rather unsatisfactory; since if it is to be used alone the oil content in it must be very accurately controlled. Paraffin, which when applied to paper shows a reasonably good strength and reasonably good blocking properties can be made, but it requires extremely close factory control and the procedures are expensive, wasteful and time-consuming, since the "sweating" operation must be carried beyond the stage ordinarily used and must be stopped at a critical point. That is, if wax alone is to be used the oil content must be below about 0.5% and above about 0.2%. If the oil content is above about 0.5% the wax "blocks" and if the oil content is below about 0.2% it has a very poor tensile strength. Thus, paraffin wax, for paper coating to be used in automatic wrapping machinery must be very carefully prepared else the paper will yield trouble in the wrapping machinery because of the tendency towards "blocking" or the tensile strength of seals will be unsatisfactorily low. Many attempts have been made to overcome these defects, with only moderate success. The most successful of these attempts has been attained by the addition to the paraffin of substantial quantities of relatively high molecular weight polyisobutylene.

The tensile strength of paraffin wax has been considerably increased by the addition of polyisobutylene, which is readily soluble in and compatible with the paraffin wax, but this two-component mixture shows little or no improvement in "blocking" characteristics. In fact, while the addition of polyisobutylene substantially improves the tensile strength of paraffin wax, it shows a distinct tendency to reduce the temperature at which "blocking" occurs.

Polyethylene has been suggested as a component in wax mixtures but it has a relatively poor compatibility with paraffin wax, and when attempts are made to combine into the polyethylene any substantial amount of paraffin wax (or oil), no more than 10 to 12 percent respectively can be worked into the polyethylene and larger amounts show the property of exuding or "bleeding," and the mixture shows very poor physical properties.

It is now found, however, that polyisobutylene will serve as a mutual solvent for the paraffin wax and the polyethylene.

Thus the invention produces a homogeneous 3-component solid solution mixture of paraffin wax, polyisobutylene and polyethylene which has a convenient melting point, is readily absorbed into paper and other fabrics, shows an excellent tensile strength and an excellent surface character of low adhesivity while retaining the property of thermosealing to yield a high strength, high water-resistant seal for the production of wrappers of high water-resistance and high strength. Thus, by the use of these three-component mixtures, it is possible to use a relatively inexpensive paraffin wax, with an oil content in a much wider percentage range, while obtaining an excellent tensile strength by virtue of the presence of polyisobutylene and excellent non-blocking properties by virtue of the polyethylene, in a mixture in which each of the 3-components serves as a mutual solvent for the other two. Accordingly, the rate of wax production in the plant need not be limited to the low value which otherwise must be had in order to prepare a satisfactory coating material. Other objects and details of the invention will be apparent from the following description.

The principal component of the composition of the present invention is paraffin wax; prepared as is well known to those skilled in the art by the chilling of hydrocarbon distillate to precipitate the wax, filtering the oil while cold to separate the wax from the lower freezing components and the "sweating" of the wax to raise the melting point to as high a value as possible. This sweated wax having a melting point between 118° F. and 145° F., preferably about 122° F. to 135° F. is the principal component of the composition of the invention.

The second component is polyisobutylene. This is prepared by chilling isobutylene to a temperature within the range between 0° C. and −103° C. and the treatment of the liquid isobutylene, pure or in the presence of various diluents, refrigerants and the like, with a Friedel-Crafts catalyst such as boron trifluoride. This polymerization process produces a polymer of isobutylene having a molecular weight range from 1,000 up to 500,000 (as determined by the Staudinger method). The preferred polymer is one having a Staudinger molecular weight number within the range between about 40,000 and 250,000, since the lower molecular weight materials do not yield as much strengthening effect as is desirable, and the higher molecular weight polymers are undesirably difficult to get into solution in the paraffin because of their rubbery character and resistance to solvents.

The third component of the mixture of the present invention is polyethylene, prepared by subjecting ethylene to temperatures ranging from about 100° C. to 500° C. and pressures of about 1,000 atmospheres to 5,000 atmospheres or higher, in the presence of traces of an oxygen type catalyst. The reaction is exothermic but is readily controlled by cooling coils and it produces a white, leathery substance which is slightly thermoplastic at elevated temperatures and highly insoluble in practically all solvents, hydrocarbon and others. This polyethylene may have a Staudinger mol. wt. of about 5,000 to 40,000 or so, preferably above 15,000, and about 20,000 to 30,000 is the best range. The solubility and compatibility of this polymer with a paraffin wax-polyisobutylene mixture is most unexpected and surprising, in view of the insolubility of this polymer in hydrocarbons generally.

The amount to be used of the two polymers will vary inversely with the melting point of the wax used, and inversely with the mol. wt. of the polymers, but normally should not exceed a total of 10%, preferably 5% by wt. The amount of polyethylene should be about 0.1% to 5%, preferably about 0.2 to 3.0% for a 7,000 M. W. polyethylene, and about 0.1 to 2.0% for a 20,000 M. W. polyethylene. The polyisobutylene should also be about 0.1% to 5.0%, preferably 0.2 to 3.0% of about 12,000 M. W., or 0.1% to 2.0% of 100,000 M. W. polyisobutylene. Best results are usually obtained with about 0.25% to 1.0% of both polyethylene and polyisobutylene, preferably keeping a ratio of 0.5 to 1.5 parts by wt. of polyisobutylene per part of polyethylene, to keep good solubility relations.

In preparing this composition of matter, the polyisobutylene and polyethylene may be milled together on the mill to obtain as intimate a mixture as possible, and the mixture of the two polymers may then be placed in a hot Werner and Pfleiderer type of kneader, to which the molten paraffin is added, very slowly at the beginning, practically at dropwise fashion to start with, until increasing amounts of paraffin wax are well incorporated into the mixed polymer and the material well softened, after which the rate of addition of the paraffin can be increased until the polymer is well in solution, whereafter the liquid mixture may be diluted with additional molten paraffin to the desired percentage and proportion composition.

The resulting mixture melts readily at temperatures between 120 and 150° C. and is readily incorporated into paper or other fabric material into which it is just as readily absorbed as is pure paraffin. In addition, when used as a wrapper the lapped edges are readily heat sealed to each other and the presence of the polyisobutylene markedly increases the strength of the mixture and the strength of the seal. At the same time, the presence of the polyethylene, by destroying the tackiness of the surface and the tendency toward pressure flow of the paraffin, substantially completely removes the "blocking" tendency, making it possible to stack printed impregnated and cut sheets of paper or fabric in piles for use in automatic wrapping machinery without danger of the stack forming a solid "block" in such a way as to prevent the feeding of the treated paper by automatic machinery to the wrapping station.

The invention will be better understood from the following examples.

EXAMPLE 1

Two mixtures were prepared, one consisting of 25 parts by weight of polyisobutylene, having a Staudinger molecular weight number of 80,000, and 75 parts by weight of microcrystalline wax; and another consisting of 24.25 parts of polyisobutylene, 74.75 parts by weight of microcrystalline wax and one part by weight of polyethylene having a Staudinger molecular weight number of approximately 20,000. Test blocks were cast from these materials having approximately one inch cube dimensions. These blocks were then set individually upon a good grade of bond paper at 25° C. and 50% relative humidity and kept in contact with the paper on a smooth desk top for 24 hours. At the end of this time the blocks were lifted at the rate of 20 inches per minute, the paper not being held in any way to the desk surface. The sample without polyethylene showed sufficient adhesion to lift the paper from the desk, whereas the sample containing polyethylene did not lift the paper from the desk. (The paper sheets were 8½ x 11″ in dimension.)

It may be noted that the tests of Example 1 show the improvement in slip between surfaces coated by the polymer; which, especially for automatic machinery, is vital. Attempts have been made to avoid "blocking" by the use of clay or talc, but such additional substances destroy the clearness of the film and very seriously reduce the water resistant properties with only a minor gain in slip from the stack. In constrast, the composition of the present invention does not suffer in water resistance; gains very greatly in slip, does not suffer substantially in tensile strength and remains clear.

EXAMPLE 2

A series of blends were prepared from wax as before, with 80,000 molecular weight polyisobutylene and 20,000 molecular weight polyethylene. The blends were made in a Baker-Perkins kneader at about 125° to 160° C. After the high molecular weight polymers had been well mixed in the 132° F. M. P. wax, the blends were tested for tensile strength.

Results are listed in Table No. I:

Table No. I

|  | 132° F. M. P. Wax | 1 | 1a | 1b | 2 | 2a | 2b | 3 | 3a | 3b |
|---|---|---|---|---|---|---|---|---|---|---|
| Percent Polyethylene | | 0.25 | 0.50 | 1.00 | | | | 0.125 | 0.25 | 0.50 |
| Percent Polyisobutylene | | | | | 0.25 | 0.50 | 1.00 | 0.125 | 0.25 | 0.50 |
| Tensile Strength (#/¼ sq. in.) | 59 | 59 | 62 | 66 | 86 | 86 | 93 | 72 | 79 | 81 |
| Blocking tem. of wax, ° F | 94 | 99 | 110 | 118 | 93 | 91 | 90 | 99 | 112 | 115 |

This test shows that the tensile strength of the polyethylene-polyisobutylene-wax mixture was greater than the polyethylene-wax mixture. For example, 0.5% polyethylene in wax gave a tensile of 62 lbs./¼ sq. in., while a blend of 0.25% polyethylene and 0.25% polyisobutylene in wax (a total of 0.5% polymer) gave a tensile of 79 lbs./¼ sq. in. Also, the blocking temperature of the wax was improved by blending polyethylene and polyisobutylene in the wax.

EXAMPLE 3

Blends were made in a Baker-Perkins type kneader at 150 to 175° C. Time in the kneader was held constant— that is—three hours. Composition of the blends are given in Table No. II:

Table No. II

| Blend No. | A | B | C | D |
|---|---|---|---|---|
| 132° F. M. P. Wax | 95% | 95% | 95% | 97% |
| 210,000 M. Wt. Staudinger Polyisobutylene | 3% | 3% | 3% | 0% |
| 20,000 M. Wt. Polyethylene | 2% | 1.5% | 1.0% | 2% |
| 2,6 di-tert. butyl-p-cresol | 0% | 0.5% | 1.0% | 1% |
| Color of blend after three hours at 150-175° C. | brown | colorless | colorless | colorless |
| Odor | Slight | none | none | none |
| Appearance of blend | smooth | smooth | smooth | not smooth |

The results shown in Example 3 indicate the value of polyisobutylene in producing smooth soluble blends of polyethylene in wax. Also, these data indicate the value of 2,6 di-tert. butyl-p-cresol in maintaining color stability in the wax polymer blends.

EXAMPLE 4

The following data, tabulated in Table III, shows the surprising increase in tensile strength obtained according to the present invention. Blends of the polymers and wax were made at 180 to 240° F. in a labratory kneader. For comparison figures are also given for the tensile strength of the plain paraffin wax, as well as blends of small amounts of separate polymers.

*Table No. III*

| | Tensile, lbs./¼ sq. inch |
|---|---|
| Paraffin wax No. 2330 1932° f. m. pt | 68 |
| Paraffin wax No. 2330+1% polyethylene (7,000 m. wt.) | 80 |
| Paraffin wax+2% polyethylene (7,000 m. wt.) | 85 |
| Paraffin wax+5% polyethylene (7,000 m. wt.) | 85 |
| Paraffin wax+1% polyethylene (20,000 to 19,000 m. wt.) | 110 |
| Paraffin wax+2% polyethylene (20,000 to 19,000 m. wt.) | 125 |
| Paraffin wax+1% 12,000 m. wt. polybutene | 80 |
| Paraffin wax+2% 12,000 m. wt. polybutene | 90 |
| Paraffin wax+5% 12,000 m. wt. polybutene | 85 |
| Paraffin wax+1% 100,000 m. wt. polybutene | 90 |
| Paraffin wax+2% 100,000 m. wt polybutene | 100 |
| Paraffin wax+5% 100,000 m. wt. polybutene | 105 |
| Paraffin wax+0.5% 20,000 m. wt. polyethylene, 0.25% 100,000 m. wt. polybutene | 100 |
| Paraffin wax+0.5% 20,000 m. wt. polyethylene, 0.5% 100,000 m. wt. polybutene | 125 |
| Paraffin wax+0.25% 7,000 m. wt. polyethylene, 0.25% 100,000 m. wt. polybutene | 85 |
| Paraffin wax+0.75% 20,000 m. wt. polyethylene, 0.75% 100,000 m. wt. polybutene | 135 |

It is seen in the above table that small amounts of polyethylene, particularly the higher molecular weight (20,000) effects a substantial increase in the tensile strength of the paraffin wax. Apparently, however, the polyethylene is not as completely soluble or compatible with the paraffin wax, and the above data show clearly that a small amount, preferably an equal amount of polyisobutylene compared to the amount of polyethylene, gives an unexpectedly greater increase in tensile strength than a corresponding total amount of either polymer separately. For instance, a blend of wax containing 0.5% of 20,000 mol. wt. polyethylene and 0.5% of 100,000 mol. wt. polybutene has a tensile strength of 125. On the other hand, the same total amount, i. e. 1%, of polyethylene alone only gave a tensile strength of 110, and 1% of 100,000 mol. wt. polybutene alone gave only a tensile strength of 90.

A still further unexpected result is obtained with slightly larger proportions of both polymers. For instance, with 0.75% of 20,000 mol. wt. polyethylene and 0.75% of 100,000 mol. wt. polybutene, the tensile strength was 135. It is doubtful whether such a high tensile strength could be obtained with any amount, even much larger percentages than a total of 1.5%, of either polymer alone. For example, although 1% of 100,000 mol. wt. polybutene increased the tensile strength from 68 to 90 (an increase of 22), 2% only gave a tensile strength of 100, indicating that the second percent only gave an increase of 10; and when an additional 3% of polybutene is used, a further increase of only 5 is obtained, thus indicating that even with much larger amounts of polybutene, it is doubtful whether the tensile strength could be raised much over 110. Similarly, the first 1% of polyethylene, alone, gave an increase of 42 (from 68 to 110), but the second per cent of polyethylene only gave an increase of 15 (from 110 to 125) and it is doubtful that even larger amounts would obtain a tensile strength much over 130. This is probably at least partly due to the low solubility of high mol. wt. polyethylene in paraffin wax.

Even with relatively low mol. wt. (e. g. 7,000) polyethylene, which has a better solubility in paraffin wax, addition of polyisobutylene effects a still further and very surprising increase in tensile strength, as shown in the above table in the blend of 0.25% of each polymer.

EXAMPLE 5

The following data are given to show the unexpected improvement in grease-resistance imparted by blending polyethylene and polyisobutylene in the wax used for making a waxed paper. In making these tests the following procedure was used:

Place each sample of waxed paper on a piece of blotting paper which rests on a smooth plane surface. Stand a rigid tube of 1" inside diameter and not less than 1" high on the specimen and from 5 grams of sand (Ottawa cement testing sand) into it. Remove the tube immediately after adding the sand, since the purpose of the tube is to assure a uniformly sized sand pile. Using a calibrated pipette or medicine dropper add 1 sum of colored bacon grease to the sand and note the time. Shift the test specimens to different spots on the paper and examine the previously covered area for stains. Shift the sample every 30 seconds for the first 2 minutes, every minute for the next 8 minutes, and every 3 minutes thereafter for 30 or more minutes. Note the first time the red stain appears on the blotting paper.

The results of these tests were as follows:

| Type of Wax | Total gauge in Inches | Grease proof time for Bacon Fat Grease |
|---|---|---|
| Blank Bond Paper | 0.003 | 1.8 minutes. |
| Paper+Paraffin wax #2330 132° F. M.P. Paraffin. | 0.007 | 29 minutes. |
| Paper+1% polyethylene 7,000 m. wt. in 2330 wax. | 0.010 | 3 hrs. and 50 min. |
| Paper+0.5% polyethylene 20,000 m. wt.+0.5% 100,000 m. wt. polybutene. | 0.010 | 12 hrs. and 12 min. |

These data show that although 1% of polyethylene of 7,000 mol. wt. in paraffin wax imparted a grease proof time of 3 hrs. and 50 minutes to the paper, a blend of 0.5% of polyethylene of 20,000 m. wt. and 0.5% of 100,000 m. wt. polybutene gave a much longer grease proof time of 12 hrs. and 12 minutes.

Similarly if hydrogen is present during the polymerization of the ethylene, it serves as a solubilizing agent, and the modified polymers of ethylene also are soluble in paraffin.

Polyethylene modified by the hydrogenation procedure shown in U. S. Patent No. 2,387,755 also shows an excellent compatibility in polyisobutylene-wax mixtures, the hydrogenated showing a higher co-solubility than the simple polyethylene.

Accordingly, the invention provides a composition of matter consisting of paraffin wax, polyethylene and a solubilizer in the form of polyisobutylene or hydrogen, by which the strength of the paraffin wax is markedly increased and its tackiness and blocking tendencies markedly decreased to yield a material which in film form or impregnated into paper or other fabric yields a wrapper of high water resistance and high tensile strength, in which the tackiness and blocking tendencies are sufficiently low to permit the material to be used in automatic wrapping machinery.

While there are above described but a limited number of embodiments of the composition of the invention, it is possible to produce still other embodiments without departing from the inventive concept herein disclosed, and it is therefore desired that only such limitations be imposed upon the appended claims as are stated therein or required by the prior art.

What is claimed is:

1. A composition consisting of paraffin wax, about 0.1 to 2% of polyethylene having a molecular weight of about 20,000 to 30,000, and about 0.1 to 3% of polyisobutylene.

2. A composition according to claim 1, containing less than 1% of 2,6 di-tert. butyl-p-cresol.

3. A non-blocking wrapper consisting of paper impregnated with the composition of claim 1.

4. A composition of matter consisting essentially of about 95–99.6% of paraffin wax, about 0.2–2% of polyethylene having a molecular weight of more than about 15,000 up to about 30,000, and about 0.2–3% of polyisobutylene having a molecular weight of about 1,000 to 500,000.

5. Composition according to claim 4 in which the polyethylene has a molecular weight of about 20,000 to 30,000, and the polyisobutylene has a molecular weight of about 12,000 to 100,000.

6. Composition according to claim 4 containing 0.5–1.5 parts by weight of polyisobutylene per part by weight of polyethylene.

7. A composition of matter having a higher tensile strength than paraffin wax and having less tack and blocking tendency than paraffin wax consisting of paraffin wax having mixed therewith from 0.125% to 3% by weight of polyisobutylene having a molecular weight in the range between 40,000 and 250,000 and 0.125% to 2% by weight of polyethylene having a molecular weight of 20,000.

8. A composition of matter according to claim 7 with .1% to 1% of di tertiary butyl paracresol.

9. A composition consisting of paraffin wax containing dissolved therein about 0.2% to 1% of polyisobutylene having a Staudinger molecular weight of about 100,000, and also about 0.2% to 1% of polyethylene having a Staudinger molecular weight of about 20,000.

10. A composition consisting of about 99.0 to 99.5% of paraffin wax, about 0.25 to 0.50% of polyethylene having a molecular weight of about 20,000 and about 0.25 to 0.50% of polyisobutylene having a molecular weight of about 80,000 to 210,000.

References Cited in the file of this patent

UNITED STATES PATENTS

| | | |
|---|---|---|
| 2,265,582 | Stevens et al. | Dec. 9, 1941 |
| 2,339,958 | Sparks | Jan. 25, 1944 |
| 2,453,644 | Steinkraus | Nov. 9, 1948 |
| 2,581,907 | Smith et al. | Jan. 8, 1952 |
| 2,582,037 | Hyde | Jan. 8, 1952 |
| 2,606,120 | Cherepow et al. | Aug. 5, 1952 |
| 2,612,458 | Stedman | Sept. 30, 1952 |